United States Patent
Nishizawa

(10) Patent No.: US 11,037,519 B2
(45) Date of Patent: Jun. 15, 2021

(54) DISPLAY DEVICE HAVING DISPLAY BASED ON DETECTION VALUE, PROGRAM, AND METHOD OF CONTROLLING DEVICE

(71) Applicant: SEIKO EPSON CORPORATION, Tokyo (JP)

(72) Inventor: Kazuo Nishizawa, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 16/663,486

(22) Filed: Oct. 25, 2019

(65) Prior Publication Data
US 2020/0135139 A1 Apr. 30, 2020

(30) Foreign Application Priority Data
Oct. 26, 2018 (JP) .............................. JP2018-201964

(51) Int. Cl.
G09G 5/00 (2006.01)
G09G 5/10 (2006.01)
G06F 3/01 (2006.01)
G06K 9/00 (2006.01)
G08B 6/00 (2006.01)
(Continued)

(52) U.S. Cl.
CPC ......... *G09G 5/006* (2013.01); *G02B 27/0172* (2013.01); *G06F 3/012* (2013.01); *G06K 9/00362* (2013.01); *G06K 9/00671* (2013.01); *G08B 6/00* (2013.01); *G09G 5/10* (2013.01); *G02B 2027/014* (2013.01); *G02B 2027/0178* (2013.01); *G09G 2320/0626* (2013.01);
(Continued)

(58) Field of Classification Search
CPC ...... G09G 5/006; G09G 5/10; G09G 2370/22; G09G 2354/00; G09G 2320/0626; G06F 3/012; G06F 2203/011; G06F 3/016; G06K 9/00671; G06K 9/00362; G06K 9/00335; G08B 6/00; G08B 21/06; G02B 27/0172; G02B 2027/0178; G02B 2027/014; H04M 1/72527; H04M 1/6058
See application file for complete search history.

(56) References Cited

U.S. PATENT DOCUMENTS 8,502,780 B1 * 8/2013 Park .................... G06F 3/04886
345/165
2013/0241948 A1 * 9/2013 Kimura ................ G02B 27/017
345/589
(Continued)

FOREIGN PATENT DOCUMENTS

JP 2016-506530 A 3/2016

*Primary Examiner* — Maurice L. McDowell, Jr.
*Assistant Examiner* — Donna J. Ricks
(74) *Attorney, Agent, or Firm* — Oliff PLC

(57) ABSTRACT

A display system includes an HMD including an image display unit worn by a user on a head and transmitting external light, a six-axis sensor and a proximity sensor provided in the image display unit, and a detected value output unit configured to output, to a personal digital assistant, detected values from the sensors, an image output unit configured to output an image, a display unit configured to display the image, an acquisition unit configured to acquire the detected values from the sensors output by the HMD, and a device control unit configured to control display of the display unit, based on the detected values acquired by the acquisition unit.

18 Claims, 5 Drawing Sheets

(51) Int. Cl.
*G02B 27/01* (2006.01)
*H04M 1/72409* (2021.01)

(52) U.S. Cl.
CPC ..... *G09G 2354/00* (2013.01); *G09G 2370/22* (2013.01); *H04M 1/72409* (2021.01)

(56) References Cited

U.S. PATENT DOCUMENTS

| | | | |
|---|---|---|---|
| 2014/0270200 A1* | 9/2014 | Usher | G10L 25/78 |
| | | | 381/57 |
| 2017/0103574 A1* | 4/2017 | Faaborg | G02B 27/0172 |
| 2018/0218135 A1* | 8/2018 | Cho | G06F 21/31 |
| 2019/0121298 A1* | 4/2019 | Xie | G04G 13/021 |

* cited by examiner

DISPLAY DEVICE HAVING DISPLAY BASED ON DETECTION VALUE, PROGRAM, AND METHOD OF CONTROLLING DEVICE

The present application is based on, and claims priority from JP Application Serial Number 2018-201964, filed Oct. 26, 2018, the disclosure of which is hereby incorporated by reference herein in its entirety.

BACKGROUND

1. Technical Field

The present disclosure relates to a display system, a device, a program, and a method of controlling the device.

2. Related Art

A system has been known in which a display apparatus is coupled to a device to display, on the display apparatus, an image displayed by the device.

JP-T-2016-506530 discloses a head-mounted display that receives, when an external apparatus is coupled to the display, data related to a first UI displayed by the external apparatus from the external apparatus and generates and displays a second UI identical to the first UI.

SUMMARY

The present disclosure improves usability of cooperative operations in a system including a device and a display apparatus.

An aspect of achieving the above-described object is a display system including a device and a display apparatus coupled to the device, the display apparatus including a transmissive type display unit being a display unit of a transmissive type configured to be worn by a user on a head and transmit external light, the transmissive type display unit displaying an image output by the device, a first sensor provided in the transmissive type display unit, and a detected value output unit configured to output, to the device, a detected value from the first sensor, and the device including a device display unit configured to display an image, an acquisition unit configured to acquire the detected value from the first sensor, output by the display apparatus, and a device control unit configured to control display of the device display unit based on the detected value acquired by the acquisition unit.

In the display system described above, the device may include an image output unit configured to output an image to the display apparatus, and a coupling detection unit configured to detect coupling to and decoupling from the display apparatus, and the image output unit may output to the display apparatus the image displayed on the device display unit and display the image on the transmissive type display unit, when coupling to the display apparatus is detected by the coupling detection unit.

In the display system described above, the device control unit may make, when coupling to the display apparatus is detected by the coupling detection unit, a display brightness of the device display unit lower than that exhibited before the coupling to the display apparatus is detected.

In the display system described above, the device control unit may make, when decoupling from the display apparatus is detected by the coupling detection unit, a display brightness of the device display unit higher than that exhibited before the decoupling from the display apparatus is detected.

In the display system described above, the device may include a voice signal processing unit configured to process a voice signal, and a first voice signal output unit configured to output the voice signal, the display apparatus may include a second voice signal output unit configured to output the voice signal, and the device control unit may cause the voice signal processing unit to change an output destination of the voice signal from the first voice signal output unit to the second voice signal output unit when coupling to the display apparatus is detected by the coupling detection unit.

In the display system described above, the device control unit may cause the voice signal processing unit to change an output level of the voice signal when coupling to the display apparatus is detected by the coupling detection unit or when decoupling from the display apparatus is detected by the coupling detection unit.

In the display system described above, the first sensor may be a proximity sensor, and the device control unit may detect mounting of the transmissive type display unit on the head, based on the detected value and make, when the mounting of the transmissive type display unit on the head is detected, a display brightness of the device display unit lower than that exhibited before the mounting of the transmissive type display unit on the head is detected.

In the display system described above, the device may include an external apparatus control unit configured to operate the display apparatus, and the device control unit may cause, when mounting of the transmissive type display unit on the head is detected, the external apparatus control unit to make the display brightness of the transmissive type display unit higher than that exhibited before the mounting of the transmissive type display unit on the head is detected.

In the display system described above, the device control unit may cause, when removal of the transmissive type display unit from the head is detected, the external apparatus control unit to make the display brightness of the transmissive type display unit lower than that exhibited before the removal of the transmissive type display unit from the head is detected.

In the display system described above, the device may include a wireless communication unit configured to perform voice communication, and the device control unit may cause the external apparatus control unit to reduce the display brightness of the transmissive type display unit when the wireless communication unit detects an incoming call.

In the display system described above, the device may include a first notification unit configured to provide notification by vibration and a state change detection unit configured to detect, based on the detected value, a state of wakefulness of the user wearing the transmissive type display unit, and the state change detection unit may be configured to operate the first notification unit when detecting that the state of wakefulness of the user is changed to a predetermined state.

In the display system described above, the display apparatus includes a second notification unit configured to provide notification by vibration, the device may include an external apparatus control unit configured to operate the display apparatus, and the state change detection unit may operate the first notification unit or cause the external apparatus control unit to operate the second notification unit, when detecting that the state of wakefulness of the user is changed to the predetermined state.

In the display system described above, the display apparatus may include a first imaging unit, the detected value output unit may output, to the device, a captured image from the first imaging unit, the device may include a second imaging unit, and the state change detection unit may determine, when detecting that the state of wakefulness of the user is changed to the predetermined state, a surrounding status of the user based on a captured image from at least one of the first imaging unit and the second imaging unit and operate the first notification unit or cause the external apparatus control unit to operate the second notification unit, based on determination result.

In the display system described above, the state change detection unit may operate the first notification unit or cause the external apparatus control unit to operate the second notification unit when detecting, based on the captured image, entry of a person into a range preset by the user.

In the display system described above, the device may include a second sensor, and the state change detection unit may detect the state of wakefulness of the user based on the detected value acquired by the acquisition unit and the detected value from the second sensor.

Another aspect of achieving the above-described object is a device coupled to a display apparatus including a transmissive type display unit worn by a user on a head and transmitting external light, the device including a device display unit configured to display an image, an acquisition unit configured to acquire a detected value from a first sensor provided in the transmissive type display unit, and a device control unit configured to control display of the device display unit based on the detected value acquired by the acquisition unit.

Another aspect of achieving the above-described object is a non-transitory computer-readable storage medium storing a program, the program causing a computer mounted in a device coupled to a display apparatus including a transmissive type display unit worn by a user on a head and transmitting external light, with the device displaying an image on the transmissive type display unit, to function as an acquisition unit configured to acquire a detected value from a first sensor provided in the transmissive type display unit, and a device control unit configured to control, based on the acquired detected value, display of a device display unit configured to display an image.

Another aspect of achieving the above-described object is a method of controlling a device coupled to a display apparatus including a transmissive type display unit worn by a user on a head and transmitting external light, the device displaying an image on the transmissive type display unit, the method including acquiring a detected value from a first sensor provided on the transmissive type display unit, and controlling, based on the acquired detected value, display of a device display unit displaying an image.

DESCRIPTION OF EXEMPLARY EMBODIMENTS

Figure 1:
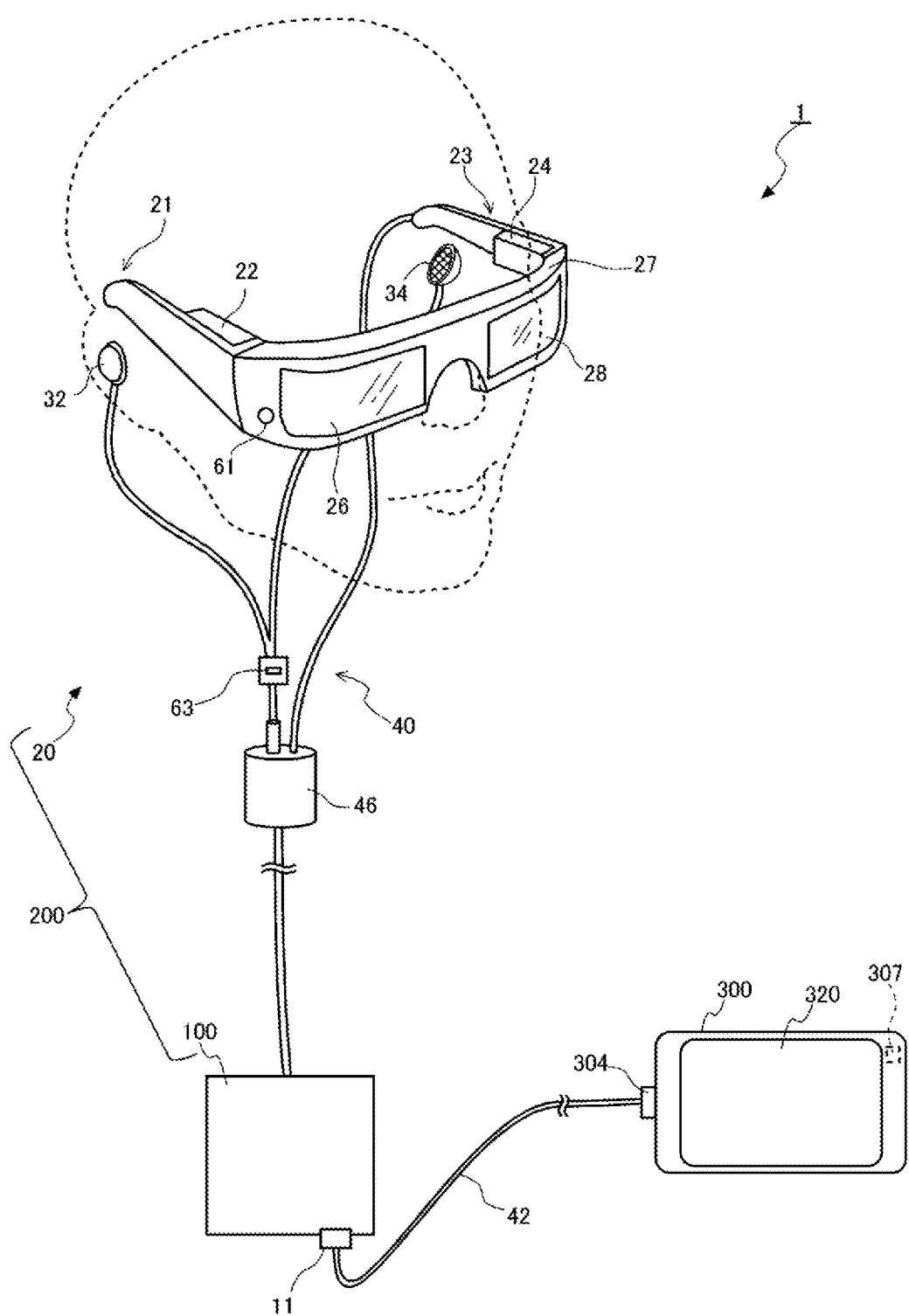
FIG. 1 is a diagram of visual appearance of an HMD and a personal digital assistant constituting a display system.

FIG. 1 is a diagram of visual appearance of an HMD 200 and a personal digital assistant 300 constituting the display system 1.

The display system 1 includes the personal digital assistant 300, which is device outputting an image, and the head-mounted display (HMD) 200, which is a display apparatus coupled to the personal digital assistant 300.

The HMD 200 includes an image display unit 20 and a coupling device 100. The image display unit 20 and the coupling device 100 are coupled via a coupling cable 40. The image display unit 20 corresponds to an example of the "transmissive type display unit" of the present disclosure.

The image display unit 20 is a mounted body to be worn by a user on hias/er head and has an eyeglasses-like shape in the present embodiment. The image display unit 20 is a transmissive type display unit that allows, while worn by the user on the head, the user to view external scenes. The image display unit 20 displays an image in front of the user's line of sight under the control of the coupling device 100. In the present embodiment, an image displayed by the image display unit 20 is an image input from the personal digital assistant 300.

The image display unit 20 includes, in a main body including a right holding part 21, a left holding part 23, and a front frame 27, a right display unit 22, a left display unit 24, a right light-guiding plate 26, and a left light-guiding plate 28.

The right holding part 21 and the left holding part 23 extend rearward from both ends of the front frame 27, respectively, and hold the image display unit 20 to the user's head similarly to temples of a pair of eyeglasses.

The right display unit 22 and the left display unit 24 are formed of an organic light emitting diode (OLED) that emits light by an organic electro luminescence, for example, and respectively output image light for right eye of the user and image light for left eye.

The right light-guiding plate 26 and the left light-guiding plate 28 are, for example, prisms. The right light-guiding plate 26 allows passage of external light and guides the external light to the right eye of the user, and also guides right image light from the right display unit 22 provided on the right holding part 21 to the right eye of the user to cause the right eye to visually recognize an image. The left light-guiding plate 28 allows passage of external light and guides the external light to the left eye of the user, and also guides left image light from the left display unit 24 provided on the left holding part 23 to the left eye of the user to cause the left eye to visually recognize an image. In this way, the image display unit 20 allows the user to visually recognize an outside scenery, and also displays an image by causing the user to visually recognize a virtual image with the image light of the right display unit 22 and the left display unit 24.

The image display unit 20 includes a camera 61 disposed in the right display unit 22. The camera 61 acquires an image in a visual recognition range of the user according to a direction of the image display unit 20 through, for example, a hole provided in the front frame 27 of the image display unit 20. The camera 61 is a digital camera equipped with, for example, an imaging element such as a charge coupled device (CCD) or a complementary metal oxide semiconductor (CMOS), and an imaging lens. The camera 61 corresponds to a "first imaging unit" of the present disclosure.

Figure 2:
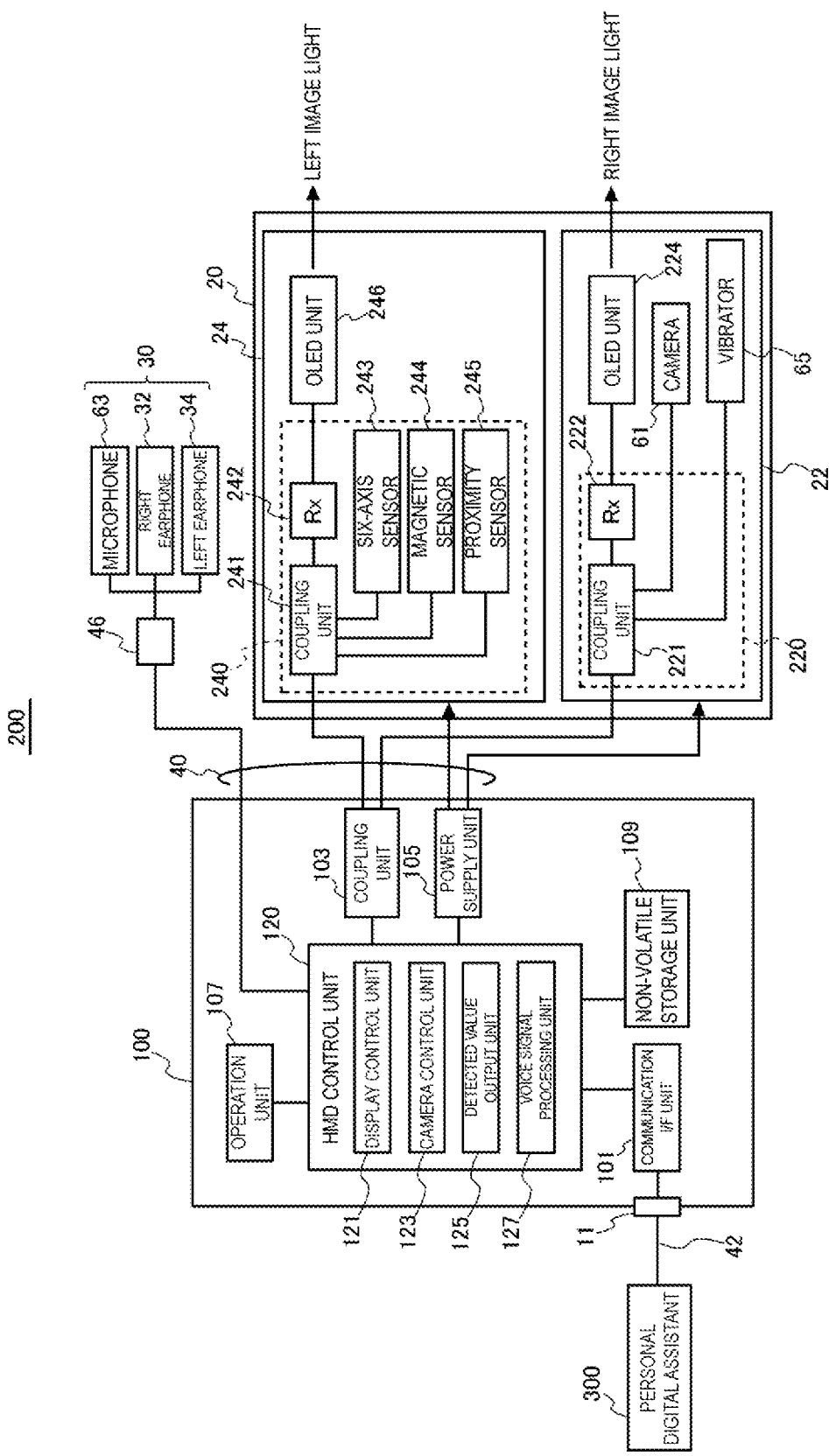
FIG. 2 is a view illustrating a configuration of an HMD.

The coupling cable 40 coupling the image display unit 20 and the coupling device 100 is provided with an audio connector 46. The audio connector 46 couples to a headset 30 including a right earphone 32 and a left earphone 34 included in a stereo headphone, and a microphone 63. The headset 30 is illustrated in FIG. 2. The right earphone 32 is mounted on the right ear of the user and the left earphone 34 is mounted on the left ear of the user. The microphone 63 collects voice around the user. The voice collected by the microphone 63 is converted into an electric signal, and the electric signal is further digitized and input to the HMD control unit 120. The microphone 63 may be, for example, a monaural microphone or a stereo microphone, or may be a directional microphone or a non-directional microphone. The right earphone 32 and the left earphone 34 correspond to an example of the "second voice signal output unit" of the present disclosure.

The coupling device 100 includes a connector 11 in a box-shaped housing and is coupled to the personal digital assistant 300 via the connector 11. The coupling device 100 receives an image output from the personal digital assistant 300 via the connector 11, controls the right display unit 22 and the left display unit 24 of the image display unit 20, and displays the received image for the user. The coupling device 100 transmits image data from the camera 61 to the personal digital assistant 300 via the connector 11. The connector 11 of the coupling device 100 is, for example, a Universal Serial Bus (USB) connector.

The personal digital assistant 300 includes a nine-axis sensor 307 configured to detect a direction and movement of the personal digital assistant 300, a display unit 320 configured to display an image, and a connector 304.

The connector 304 of the personal digital assistant 300 is, for example, a USB connector. The connector 304 and the connector 11 are coupled to each other via a communication cable 42 as a USB cable, for example.

The personal digital assistant 300 is, for example, a smartphone in the present embodiment. However, the personal digital assistant 300 may include a portable computer such as a tablet computer and a notebook computer. The personal digital assistant 300 may be a wearable terminal such as a clock computer or may be a smart speaker equipped with a computer. Furthermore, the personal digital assistant 300 may be a very small computer referred to as what is called a stick PC.

FIG. 2 is a diagram illustrating a configuration of the HMD 200.

The configuration of HMD 200 will be described with reference to FIG. 2. As described above, the HMD 200 includes the coupling device 100 and the image display unit 20 coupled to each other via the communication cable 40.

The image display unit 20 includes the right display unit 22 and the left display unit 24. The right display unit 22 includes a display unit substrate 220. The display unit substrate 220 is equipped with a coupling unit 221 configured to be coupled to the coupling cable 40, and a reception unit 222 configured to receive data input from the coupling device 100 via the coupling unit 221. The coupling unit 221 couples the receiver 222, the camera 61, and a vibrator 65 to the coupling device 100. An OLED unit 224 is coupled to the reception unit 222. Note that in FIG. 2, the reception unit is designated as "Rx".

The camera 61 performs imaging in accordance with a signal input via the coupling unit 221 and outputs imaging data to the coupling unit 221.

The vibrator 65 includes a motor (not illustrated), an eccentric rotor, and the like, and causes vibration in accordance with a signal input via the coupling device 100. The vibrator 65 corresponds to an example of the "second notification unit" of the present disclosure.

The reception unit 222 receives a right image signal as an image signal for the right eye from the coupling device 100 and outputs the right image signal to the OLED unit 224. The OLED unit 224 includes, for example, an OLED (not illustrated) and a drive circuit (not illustrated) that drives the OLED. The OLED and drive circuit are not illustrated in the figures. The OLED unit 224 outputs right image light toward the right light-guiding plate 26 based on the received right image signal.

The left display unit 24 includes a display unit substrate 240. The display unit substrate 240 is equipped with a coupling unit 241 configured to be coupled to the coupling cable 40, a reception unit 242 configured to receive data input from the coupling device 100 via the coupling unit 241, a six-axis sensor 243, a magnetic sensor 244, and a proximity sensor 245. The coupling unit 241 couples the reception unit 242, the six-axis sensor 243, the magnetic sensor 244, and the proximity sensor 245 to the coupling device 100. An OLED unit 246 is coupled to the reception unit 242. The six-axis sensor 243, magnetic sensor 244 and proximity sensor 245 correspond to a "first sensor" of the present disclosure, but other sensors can also be provided in the image display unit 20.

The six-axis sensor 243 is a motion sensor including a three-axis acceleration sensor and a three-axis gyro sensor. The six-axis sensor 243 may include an inertial measurement unit (IMU) in which the above-described sensors are provided as modules. The magnetic sensor 244 is a three-axis geomagnetic sensor, for example. The proximity sensor 245 is a sensor configured to detect that an object is approaching the image display unit 20. Specifically, the proximity sensor 245 is a sensor configured to detect mounting of the image display unit 20 on the head of the user and removal of the image display unit 20 from the head of the user. The proximity sensor 245 includes, for example, an infrared proximity sensor.

The reception unit 242 receives a left image signal as an image signal for the left eye from the coupling device 100 and outputs the left image signal to the OLED unit 246. The OLED unit 246 includes, for example, an OLED and a drive circuit configured to drive the OLED, similarly to the OLED unit 224. The OLED unit 246 outputs left image light toward the left light-guiding plate 28 based on the received left image signal.

Each of the components of the image display unit 20 operates with power supplied from a power supply unit 105 of the coupling device 100 via the coupling cable 40. The image display unit 20 may include a power supply circuit configured to distribute a power supply input from the power supply unit 105 and to perform voltage conversion and the like. Illustration of the power supply circuit is omitted.

Now, a configuration of the coupling device 100 will be described.

The coupling device 100 includes a communication interface unit 101, a coupling unit 103, the power supply 105, an operation unit 107, a non-volatile storage unit 109, and an HMD control unit 120. Note that the interface is abbreviated as I/F.

Figure 3:
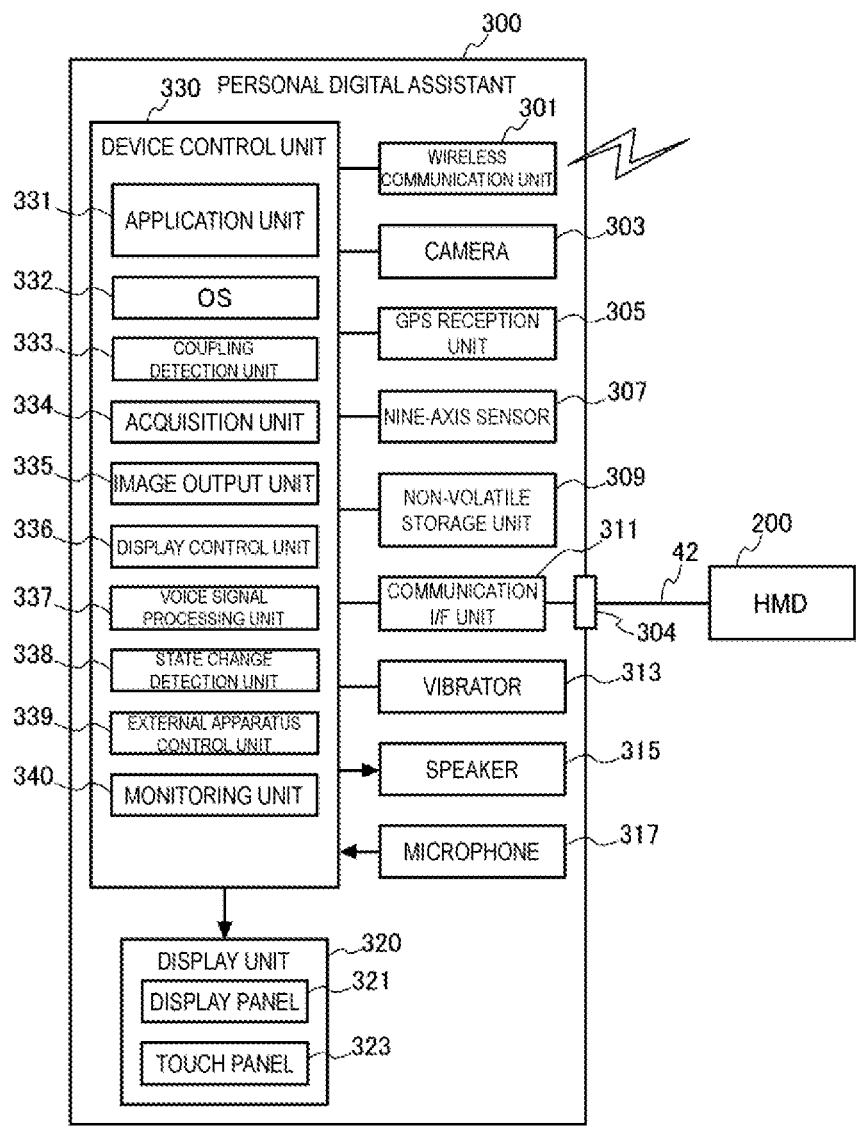
FIG. 3 is a diagram illustrating a configuration of the personal digital assistant.

The communication I/F unit 101 performs wired communication with the communication I/F unit 311 of the personal digital assistant 300 in conformity with USB communication standards, for example. However, communication between the wireless I/F unit 311 and the communication I/F unit 101 is not limited to the wired communication in conformity with USB communication standards, and may be performed in conformity with other various communication standards including wired and wireless communication standards. The communication I/F unit 311 of the personal digital assistant 300 is illustrated in FIG. 3.

The coupling unit 103 is coupled to the coupling unit 221 and the coupling unit 241 of the image display unit 20 via the coupling cable 40.

The power supply unit 105 supplies power to the image display unit 20 and each of the components of the coupling device 100 based on power supplied from the personal digital assistant 300 via the communication cable 42 and the communication I/F unit 101. The power supply unit 105 may incorporate a voltage conversion circuit (not illustrated) and be able to supply different voltages to each of the components of the coupling device 100 and the image display unit 20. The power supply unit 105 can include a logic circuit or a device such as an FPGA. Note that the power supply unit 105 is not limited to the above-described configuration and may supply power to the image display unit 20 and each of the components of the coupling device 100 based on power from a chargeable battery provided in the coupling device 100 instead of power supplied from the personal digital assistant 300.

The operation unit 107 includes buttons or switches that can be operated by the user and functions as an acceptance unit configured to accept instructions from the user.

The non-volatile storage unit 109 is a storage device configured to store data in a non-volatile manner. The non-volatile storage unit 109 can include, for example, a magnetic recording device such as a Hard Disk Drive (HDD), or a storage device such as a flash memory which includes semiconductor storage elements. The non-volatile storage unit 109 is configured to store a control program to be executed by a processor of the HMD control unit 120, setting values, and data to be processed by the HMD control unit 120. The setting values include, for example, a value to which a display brightness of the image display unit 20 is set, and include the user's preferred display brightness value.

The HMD control unit 120 is, for example, a computer including a processor such as a central processing unit (CPU). The HMD control unit 120 may include a read only memory (ROM) to which a program is written and a random access memory (RAM) used to store data temporarily. The HMD control unit 120 includes, as functional elements, a display control unit 121, a camera control unit 123, a detected value output unit 125, and a voice signal processing unit 127.

The functional elements provided in the HMD control unit 120 are implemented, for example, by execution of a control program by the HMD control unit 120 as a computer. The control program is stored, for example, in the ROM of the HMD control unit 120 and the nonvolatile storage 109.

All or some of the above-described functional elements provided in the HMD control unit 120 may include pieces of hardware each including one or more electronic circuit components. The hardware may be programmed hardware such as a digital signal processor (DSP) and a field programmable gate array (FPGA).

Based on image data received from the personal digital assistant 300, the display control unit 121 generates a right image signal and a left image signal used for display on the image display unit 20. The display control unit 220 respectively transmits the generated right image signal and left image signal to the reception units 222 and 242 of the image display unit 20 via the coupling unit 103. In this way, an image output from the personal digital assistant 300 is displayed on the image display unit 20.

The camera control unit 123 causes the camera 61 to perform imaging, to acquire imaging data provided by the camera 61. The camera control unit 123 transmits the acquired imaging data to the personal digital assistant 300 via the communication I/F unit 101.

When receiving a sensor value acquisition request from the personal digital assistant 300, the detected value output unit 125 acquires, from the left display unit 24, detected values from the six-axis sensor 243, the magnetic sensor 244, and the proximity sensor 245. The detected value output unit 125 transmits the acquired detected values to the personal digital assistant 300 via the communication I/F unit 101.

The voice signal processing unit 127 outputs voice received from the personal digital assistant 300 via the communication I/F unit 101 to the right earphone 32 and the left earphone 34. The voice signal processing unit 127 can change the voice output of the right earphone 32 and the left earphone 34. In other words, the voice signal processing unit 127 can amplify or mute the voice received from the personal digital assistant 300.

Now, the personal digital assistant 300 will be described with reference to FIG. 3.

The personal digital assistant 300 includes a wireless communication unit 301, a camera 303, a GPS reception unit 305, a nine-axis sensor 307, a non-volatile storage unit 309, a communication I/F unit 311, a vibrator 313, a speaker 315, a microphone 317, a display unit 320, and a device control unit 330.

The wireless communication unit 301 is coupled to what is called a mobile communication network via a base station, and has a function to perform voice communication corresponding to telephone calls and data communication. Specifically, the wireless communication unit 301 functions as an incoming call unit configured to accept an incoming call including an incoming telephone number and to perform incoming call processing, and an outgoing call unit configured to perform outgoing call processing in accordance with an outgoing call instruction from a user. The wireless communication unit 301 performs data communication with a communication device such as a web server connected to the Internet, or with any other personal digital assistant 300.

The camera 303 is a digital camera equipped with an imaging element, for example, a charge-coupled device (CCD) or a complementary metal oxide semiconductor (CMOS), an imaging lens, and the like. The camera 303 corresponds to an example of the "second imaging unit" of the present disclosure.

The GPS reception unit 305 measures the position of the personal digital assistant 300 based on GPS signals received from a GPS satellite, and outputs measurement results to the device control unit 330.

The nine-axis sensor 307 includes, for example, a three-axis acceleration sensor and a three-axis gyro sensor as a motion sensor and a magnetic sensor as a three-axis geomagnetic sensor. The nine-axis sensor 307 corresponds to the "second sensor" of the present disclosure, but a sensor other than the nine-axis sensor 307 can be provided in the personal digital assistant 300.

The non-volatile storage unit 309 is a storage device configured to store data in a non-volatile manner. The non-volatile storage unit 309 includes, for example, a storage device such as a flash memory including semiconductor storage elements.

The non-volatile storage unit 309 stores, for example, an operating system (OS) as a basic control program executed by the device control unit 330, and an application program operating using the operating system as a platform. The non-volatile storage unit 309 is configured to store data processed during execution of the application program, data of processing results, and the like.

The non-volatile storage unit 309 also stores setting data and setting values.

The setting data is data that sets processing to be executed when the state change detection unit 338 described below detects a change in the state of the personal digital assistant 300 or HMD 200, the processing being executed by the device control unit 330 in accordance with the detected change in state. The setting data can be modified by operation of the touch panel 323 or the operation unit 107. The setting values are values for the display brightness of the display unit 320 and the voice output of the speaker 315, and are preferred set by the user. The setting values are values for the voice output of the right earphone 32 and the left earphone 34 of the HMD 200 and are preferred values set by the user.

The communication I/F unit 311 performs wired communication with the communication I/F unit 101 of the coupling device 100, for example, in conformity with USB communication standards.

The vibrator 313 includes a motor (not illustrated), an eccentric rotor, and the like, and causes vibration under the control of the device control unit 330. The vibrator 313 corresponds to an example of a "first notification unit" of the present disclosure.

The speaker 315 outputs, for example, the voice of an intended party and voice in a moving image reproduced by the device control unit 330. The microphone 317 collects voice around the personal digital assistant 300. The voice collected by the microphone 317 is converted into an electric signal, and the electric signal is further digitized and input to the device control unit 330. The speaker 315 corresponds to an example of a "first voice signal output unit" of the present disclosure.

The display unit 320 includes a display panel 321 and a touch panel 323. The display unit 320 corresponds to an example of the "device display unit" of the present disclosure.

The display panel 321 is, for example, a liquid crystal display panel. The touch panel 323 includes, for example, a touch sensor. In addition to displaying images on the display panel 321, the display unit 320 displays a user interface (UI) such as buttons on the display panel 321 and cooperates with the touch sensor of the touch panel 323 in acquiring inputs from the user.

The device control unit 330 includes an application unit 331, an OS 332, a coupling detection unit 333, an acquisition unit 334, an image output unit 335, a display control unit 336, a voice signal processing unit 337, a state change detection unit 338, an external apparatus control unit 339, and a monitoring unit 340. The functional elements provided in the device control unit 330 are implemented, for example, by execution of a program by the device control unit 330 as a computer.

All or some of the above-described functional elements provided in the device control unit 330 may include pieces of hardware each including one or more electronic circuit components. The hardware includes programmed hardware such as a DSP and an FPGA.

The application unit 331 is implemented by execution of an application program by the device control unit 330, and displays moving images and still images, which are video, on the display unit 320. Moving images and still images are collectively referred to as "images". The application unit 331 executes an application program to function, for example, as a reproduction unit configured to reproduce moving image data and still image data. The application unit 331 executes an application program to function as a display unit configured to cause the display unit 320 to display the document file. The application programs are, for example, downloaded by the device control unit 330 from a server on the World Wide Web via the wireless communication unit 301 and stored in the non-volatile storage unit 309.

The OS 332 is implemented by the device control unit 330, for example, by executing an OS program stored in advance in the non-volatile storage unit 309. The OS 332 includes a device driver configured to operate various devices including the GPS reception unit 305, the nine-axis sensor 307, the display unit 320, and the communication I/F unit 311 provided in the personal digital assistant 300. The OS 332 provides various APIs to the application unit 331.

The coupling detection unit 333, for example, acquires status information of the communication I/F unit 311 via the OS 332. The coupling detection unit 333 detects that an external display apparatus is coupled to the personal digital assistant 300 based on the acquired status information. The coupling detection unit 333 detects coupling to the display apparatus, and then transmits, to the state change detection unit 338, a notification that coupling has been detected. In the description of the present embodiment, the external display apparatus is the HMD 200.

Furthermore, the coupling detection unit 333 detects that the personal digital assistant 300 and the HMD 200 have been decoupled from each other based on the acquired status information of the communication I/F unit 311. The coupling detection unit 333 detects that the HMD 200 has been decoupled, and then transmits, to the state change detection unit 338, a notification that the HMD 200 has been decoupled.

The acquisition unit 334 transmits, to the coupling device 100, a request to acquire detected values from the sensors, and acquires, from the coupling device 100, detected values from the sensors. The sensors from which the acquisition unit 334 acquires detected values include the six-axis sensor 243, the magnetic sensor 244, and the proximity sensor 245. The acquisition unit 334 outputs, to the state change detection unit 338, the acquired detected values from the sensors.

When receiving an instruction for image output from the state change detection unit 338, the image output unit 335 uses a mirroring function included in the OS 332 to output, to the HMD 200, an image displayed on the display unit 320. Specifically, the image output unit 335 indicates, to the OS 332, the image currently displayed on the display unit 320, and instructs the OS 332 to output the indicate image to the HMD 200 using the mirroring function.

The image displayed on the display unit 320 is an image generated by the OS 332 or an image generated by the application unit 331. The image output unit 335 starts outputting the image to the HMD 200, and then notifies the state change detection unit 338 that the output of the image to the HMD 200 has been started.

The display control unit 336 controls display of the display unit 20. For example, the display control unit 336 displays an image on the display unit 320. The image may be, for example, pre-stored in the non-volatile storage unit 309 or downloaded from a server on the World Wide Web or the like via the wireless communication unit 301. The image displayed by the display control unit 336 may be a moving image or a still image. The display control unit 336 changes the display brightness of the display panel 321 or changes the image displayed on the display panel 321, in accordance with an operation accepted via the touch panel 323.

The voice signal processing unit 337 performs reproduction processing such as D/A conversion and amplification on voice data input from the device control unit 330, and outputs resultant voice from the speaker 315. The voice data is included in the moving image data reproduced by the application unit 331 or is received by the wireless communication unit 301. The voice signal processing unit 337 may perform additional processing such as noise removal on the voice data. The voice signal processing unit 337 also performs up-converting and amplifying processing on the voice data input through the microphone 317 to wirelessly transmit, from the wireless communication unit 301, a signal resulting from the processing.

The state change detection unit 338 detects a change in the states of the personal digital assistant 300, the HMD 200, and the user. The external apparatus control unit 339 outputs an instruction signal to the HMD 200 to control operations of the HMD 200. The monitoring unit 340 monitors the surroundings of the user when the state change detection unit 338 determines that the user is asleep.

Operations of the state change detection unit 338, the external apparatus control unit 339, and the monitoring unit 340 will be described in further detail.

The state change detection unit 338 detects a change in state using the functions of the wireless communication unit 301, the nine-axis sensor 307, and the camera 303 mounted in the personal digital assistant 300 and the functions of the coupling detection unit 333 and the image output unit 335 included in the personal digital assistant 300. The state change detection unit 338 detects a change in state using the six-axis sensor 243, the magnetic sensor 244, the proximity sensor 245, and the camera 61 mounted in the HMD 200.

Changes in the state of the personal digital assistant 300 detected by the state change detection unit 338 are, for example, as described below.

The state change detection unit 338 detects coupling and decoupling of the HMD 200, which is an external apparatus, based on a notification from the coupling detection unit 333. When detecting coupling to the HMD 200, the coupling detection unit 333 notifies the state change detection unit 338 that the coupling has been detected. When detecting decoupling from the HMD 200, the coupling detection unit 333 notifies the state change detection unit 338 that the decoupling has been detected.

The state change detection unit 338 detects, for example, whether an incoming call has been received or not, based on a notification from the wireless communication unit 301. When detecting an incoming call, the wireless communication unit 301 notifies the state change detection unit 338 that the incoming call has been detected.

Changes in the state of the HMD 200 detected by the state change detection unit 338 are, for example, as described below.

The state change detection unit 338 detects mounting and removal of the image display unit 20 to and from the head of the user based on a detected value from the proximity sensor 245.

Changes in the state of the user detected by the state change detection unit 338 are, for example, as described below.

The state change detection unit 338 detects a state of wakefulness and a fall of the user based on detected values from the six-axis sensor 243 and the nine-axis sensor 307.

For example, the state change detection unit 338 detects the state of wakefulness of the user based on a detected value for acceleration acquired by at least one of the six-axis sensor 243 and the nine-axis sensor 307. For example, when in a case where the range of fluctuation in detected acceleration value within a preset time is less than or equal to the first threshold, the state change detection unit 338 determines that a state of wakefulness rate of the user has decreased degrade the state of wakefulness to a first level. The degradation of the state of wakefulness to the first level corresponds to a change of the state of wakefulness to a predetermined state.

When the range of fluctuation in detected acceleration value within the preset set time is less than or equal to the second threshold that is less than the first threshold, the state change detection unit 338 determines that the wakefulness of the user has significantly degraded to a second level. The second level is a level at which the wakefulness rate is lower than that at the first level and at which the user can be determined to be asleep.

Furthermore, the state change detection unit 338 determines that the user has fallen when the detected acceleration value acquired by at least one of the six-axis sensor 243 and the nine-axis sensor 307 is more than or equal to a preset third threshold.

When detecting a change in the state of the personal digital assistant 300, the HMD 200, or the user, the state change detection unit 338 references the setting data stored in the non-volatile storage unit 309 to acquire processing associated with the detected change in state. The state change detection unit 338 causes the acquired processing to be executed.

For example, when coupling of the HMD 200 is detected by the coupling detection unit 333, the state change detection unit 338 outputs an instruction for image output to the image output unit 335. When receiving the instruction for image output from the state change detection unit 338, the image output unit 335 outputs, to the HMD 200, the image displayed on the display unit 320 by the display control unit 121, and displays the image on the image display unit 20.

When detecting coupling of the HMD 200, the state change detection unit 338 outputs, to the display control unit 336, an instruction to reduce the display brightness of the display panel 321. In the description of the present embodiment, the instruction is intended to change the display brightness of the display panel 321 to "0". However, the instruction need not necessarily be intended to change the display brightness of the display panel 321 to "0" so long as the instruction is intended to reduce the display brightness of the display panel 321. When detecting coupling of the HMD 200, the state change detection unit 338 outputs, to the voice signal processing unit 337, an instruction to change a voice output destination and an instruction to change the voice output to an output corresponding to a setting value for the voice output of the HMD 200 stored in the non-volatile storage unit 309.

When receiving, from the state change detection unit 338, the instruction to change the display brightness, the display control unit 336 causes the current setting value for the display brightness of the display panel 321 to be stored in the non-volatile storage unit 309. Thereafter, the display control unit 336 changes the display brightness of the display panel 321 to "0". When the HMD 200 is coupled to the personal digital assistant 300, the user is assumed to view the image through the HMD 200 rather than on the display panel 321 of the personal digital assistant 300. Thus, the display control unit 336 causes the brightness of the display panel 321 of the display unit 320 to be changed to "0", reducing unwanted power consumption.

When receiving, from the state change detection unit 338, the instruction to change the voice output destination and the instruction to change the voice output, the voice signal processing unit 337 causes the current setting value for the voice output of the speaker 315 to be stored in the nonvolatile storage unit 309. Thereafter, the voice signal processing unit 337 changes the voice output destination from the speaker 315 to the HMD 200. The voice signal processing unit 337 changes the voice output to the HMD 200 to an output corresponding to the setting value for the voice output of the HMD 200 stored in the non-volatile storage unit 309. The HMD control unit 120 of the HMD 200 causes voice input from the personal digital assistant 300 to be output from the right earphone 32 and the left earphone 34.

When the coupling detection unit 333 detects decoupling of the HMD 200, the state change detection unit 338 outputs, to the display control unit 336, a change instruction to change the display brightness of the display panel 321 to a value obtained before the coupling of the HMD 200 is detected. The state change detection unit 338 outputs, to the voice signal processing unit 337, a change instruction to change the voice output destination from the HMD 200 to the speaker 315 and a change instruction to change the voice output of the speaker 315 to a value obtained before the coupling of the HMD 200 is detected.

When receiving, from the state change detection unit 338, the change instruction to change the display brightness to the value obtained before the coupling of the HMD 200 is detected, the display control unit 336 reads the setting value for the display brightness of the display panel 321 stored in the non-volatile storage unit 309. The display control unit 336 changes the display brightness of the display panel 321 to a display brightness corresponding to the setting value read from the non-volatile storage unit 309. Accordingly, the display brightness of the display panel 321 is made higher than when the HMD 200 is coupled.

When receiving, from the state change detection unit 338, the change instruction to change the voice output destination and the change instruction to change the vice output of the speaker 315 to the value obtained before the coupling is detected, the voice signal processing unit 337 changes the voice output destination from the HMD 200 to the speaker 315. Thereafter, the voice signal processing unit 337 reads the setting value for the voice output of the speaker 315 stored in the non-volatile storage unit 309. The voice signal processing unit 337 changes the voice from the speaker 315 to a voice output corresponding to a setting value read from the non-volatile storage unit 309.

When an incoming call is detected by the wireless communication unit 301, the state change detection unit 338 outputs, to the external apparatus control unit 339, a change instruction to reduce the display brightness of the image display unit 20. In the description of the present embodiment, the state change detection unit 338 outputs the change instruction to change the display brightness of the image display unit 20 to "0". However, the instruction need not necessarily be intended to change the display brightness to "0" so long as the instruction is intended to reduce the display brightness of the image display unit 20.

When receiving, from the state change detection unit 338, the change instruction to change the display brightness of the image display unit 20 to "0", the external apparatus control unit 339 generates control data used for changing the display brightness of the image display unit 20 to "0". The external apparatus control unit 339 transmits the generated control data to the HMD 200 via the communication I/F unit 311. The HMD control unit 120 receives the control data and then changes the display brightness of the image display unit 20 to "0". This allows the user wearing the image display unit 20 to easily view the scene outside of the image display unit 20.

When detecting the start of image output to the HMD 200, the state change detection unit 338 outputs, to the display control unit 336, an instruction to reduce the display brightness of the display panel 321. Also in this case, in the description, the instruction is intended to change the display brightness of the display panel 321 to "0". However, it is sufficient that the instruction is intended to reduce the display brightness of the display panel 321. The state change detection unit 338 outputs, to the voice signal processing unit 337, the change instruction to change the voice output destination and the change instruction to change the voice output to the output corresponding to the setting value for the voice output of the HMD 200 stored in the non-volatile storage unit 309.

The subsequent operations of the display control unit 336 and the voice signal processing unit 337 are the same as the operations performed when the state change detection unit 338 detects the coupling of the HMD 200, and thus detailed description the operations is omitted.

When detecting mounting of the image display unit 20 on the head, the state change detection unit 338 outputs, to the display control unit 336, the instruction to reduce the display brightness of the display panel 321. The display control unit 336 reduces the display brightness of the display panel 321 in accordance with the instruction from the state change detection unit 338. Also in this case, in the description, the instruction is intended to change the display brightness of the display panel 321 to "0". However, it is sufficient that the instruction is intended to reduce the display brightness of the display panel 321.

When detecting mounting of the image display unit 20 on the head, the change detection unit 338 outputs, to the external apparatus control unit 339, a change instruction to change the display brightness of the image display unit 20 to the setting value for the display brightness stored in the non-volatile storage unit 109. Furthermore, the state change detection unit 338 outputs, to the voice signal processing unit 337, a change instruction that changes the output destination of the voice from the speaker 315 to the HMD 200, and an instruction to change the voice output to an output corresponding to a setting value of the voice output of the HMD 200 stored in the non-volatile storage unit 309.

When receiving the change instruction from the state change detection unit 338, the external apparatus control unit 339 generates control data used for changing the display brightness of the image display unit 20 to the setting value stored in the non-volatile storage unit 109. The external apparatus control unit 339 transmits the generated control data to the coupling device 100 via the communication I/F unit 311.

When receiving the control data from the personal digital assistant 300, the display control unit 121 of the HMD control unit 120 reads the setting value for the display brightness stored in the non-volatile storage unit 109, and changes the display brightness of the image display unit 20 to a display brightness corresponding to the read setting value. Accordingly, the display brightness of the image display unit 20 is changed to a value higher than the value used before the mounting of the image display unit 20 on the head is detected.

When receiving, from the state change detection unit 338, the change instruction to change the voice output destination and the change instruction to change the voice output, the voice signal processing unit 337 causes the current setting value for the voice output of the speaker 315 to be stored in the non-volatile storage unit 309. Thereafter, the voice signal processing unit 337 changes the voice output destination from the speaker 315 to the HMD 200. The voice signal processing unit 337 then changes the voice output to the HMD 200 to the voice output corresponding to the setting value for the voice output of the HMD 200 stored in the non-volatile storage unit 309. The HMD control unit 120 of the HMD 200 outputs, to the right earphone 32 and the left earphone 34, the voice input from the personal digital assistant 300.

When detecting removal of the image display unit 20 from the head, the change detection unit 338 outputs, to the external apparatus control unit 339, the change instruction to change the display brightness of the image display unit 20 to "0". The state change detection unit 338 outputs, to the voice signal processing unit 337, the change instruction to change the voice output destination and the change instruction to change the voice output to the setting value for the voice output of the speaker 315 stored in the non-volatile storage unit 309.

When receiving the change instruction from the state change detection unit 338, the external apparatus control unit 339 generates control data used for changing the display brightness and the voice output to "0". The external apparatus control unit 339 transmits the generated control data to the coupling device 100 via the communication I/F unit 311.

When receiving the control data, the display control unit 121 of the HMD control unit 120 causes the current setting value for the display brightness of the image display unit 20 to be stored in the non-volatile storage unit 109. Thereafter, the display control unit 121 changes the display brightness of the image display unit 20 to "0".

When receiving the change instruction to change the voice output destination and the change instruction to change the voice output, the voice signal processing unit 337 changes the voice output destination from the HMD 200 to the speaker 315. Thereafter, the voice signal processing unit 337 causes the setting value for the voice output of the HMD 200 to be stored in the non-volatile storage unit 309. Thereafter, the voice signal processing unit 337 outputs, from the speaker 315, the voice corresponding to the setting value for the voice output of the speaker 315 stored in the non-volatile storage unit 309.

When detecting a fall of the user, the state change detection unit 338 outputs, to the display control unit 336, an instruction to display a message on the display panel 321.

When receiving the instruction for message display from the state change detection unit 338, the display control unit 336 causes the display panel 321 to display a confirmation screen for determining whether to call an ambulance or not. When accepting, via the touch panel 323, an operation for calling an ambulance, the state change detection unit 338 causes the wireless communication unit 301 to originate a call and generates a voice message corresponding to an ambulance call. The state change detection unit 338 causes the wireless communication unit 301 to originate a call to a preset outgoing destination and outputs, from the speaker 315, the voice message corresponding to an ambulance call. The voice message may include a voice message corresponding to the current position of the personal digital assistant 300 received by the GPS reception unit 305. When accepting, via the touch panel 323, the operation for calling an ambulance, the state change detection unit 338 may transmit, to a preset destination, a message corresponding to an ambulance call.

When detecting degradation of the wakefulness of the user to the first level, the state change detection unit 338 causes the vibrator 313 to be driven to vibrate the housing of the personal digital assistant 300. The state change detection unit 338 may output, to the external apparatus control unit 339, an instruction to drive the vibrator 65. When receiving the vibration instruction from the state change detection unit 338, the external apparatus control unit 339 outputs, to the HMD 200, an instruction to drive the vibrator 65, to cause the vibrator 65 to be driven. By vibrating the housing of the personal digital assistant 300 or of the image display unit 20 of the HMD 200, the user can be kept awake.

When detecting degradation of wakefulness of the user to the first level, the state change detection unit 338 may clock a predetermined time, and after the predetermined time elapses, cause the vibrator 313 or the vibrator 65 to be driven. The change state detection unit 338 may cause the external device control unit 339 to generate control used for changing the display brightness of the image display unit 20 to "0", and to transmit the generated control data to the HMD control unit 120 of the coupling device 100. The HMD control unit 120 of the coupling device 100 receives the control data and then changes the display brightness of the image display unit 20 to "0".

When detecting degradation of wakefulness of the user to the second level, the condition change detection unit 338 outputs, to the monitoring unit 340, a monitoring instruction to start monitoring surroundings of the user. When receiving the monitoring instruction from the state change detection unit 338, the monitoring unit 340 causes the camera 61 mounted in the HMD 200 or the camera 303 of the personal digital assistant 300 to perform imaging and determines a surrounding status of the user. For example, the monitoring unit 340 detects a person based on imaging data from the camera 61 or the camera 303 to determine whether any person is approaching the user or not.

The monitoring unit 340 causes at least one of the camera 61 and the camera 303 to perform imaging to acquire imaging data. The monitoring unit 340 detects, in the acquired imaging data, a person region that is a region where a person is imaged. As a method of detecting a person region, a commonly known method can be used, for example, a detection method based on features of the face of a person or organs such as the mouth and the eyes, or detection based on the hue of a skin area of a person or the like. A plurality of methods may be combined to detect the person region.

For example, when detecting the person region in the imaging data from the camera 61, the monitoring unit 340 detects a distance to the person in the detected person region. For example, the monitoring unit 340 detects the distance to the person based on the size of the person in the imaging data.

The monitoring unit 340 determines whether the detected person is suspicious or not based on the distance to the detected person. For example, the monitoring unit 340 determines that the detected person is suspicious when the following conditions are satisfied. For example, when the same person is detected in plurality of imaging data and the distance to the detected person gradually decreases, the person is determined to be approaching the user, and then, the distance to the detected person becomes less than or equal to a preset threshold.

Furthermore, the monitoring unit 340 may determine whether the person detected based on the orientation of the face of the person in the person region or the line of sight of the person is suspicious or not. For example, when a suspicious person is attempting to steal a belonging from a sleeping person, the face or line of sight of the suspicious person is pointed toward the sleeping person. Thus, when the above-described conditions are satisfied, both eyes of the person are detected in the imaging data, and the person is determined to face the user's direction, the monitoring unit 340 may determine that the detected person is suspicious.

The monitoring unit 340 may detect a moving portion such as the iris or the pupil in the person region to detect the line of sight. When the detected line of sight is directed toward the user, the monitoring unit 340 may determine that the detected person is suspicious.

When detecting a suspicious person, the monitoring unit 340 causes the vibrator 313 or the vibrator 65 to be driven to awaken the user. When detecting a suspicious person, the monitoring unit 340 may cause the voice signal processing unit 337 to output a beep sound from the speaker 315.

The monitoring unit 340 causes the display control unit 336 to display a confirmation screen for determining whether to originate a call to a preset outgoing destination or not, on the display unit 320. The preset outgoing destination is, for example, the police or a security company. When accepting, via the touch panel 323, an operation for originating a call to the preset outgoing destination, the monitoring unit 340 controls the wireless communication unit 301 to originate a call to the preset outgoing destination.

When detecting a suspicious person, the monitoring unit 340 causes the external apparatus control unit 339 to generate control data used for changing the display brightness of the image display unit 20 to "0" and changing the voice output to "0", and to transmit the generated control data to the coupling device 100. The display control unit 121 changes the display brightness of the image display unit 20 to "0", and the voice signal processing unit 127 changes the voice outputs of the right earphone 32 and the left earphone 34 to "0".

Figure 4:
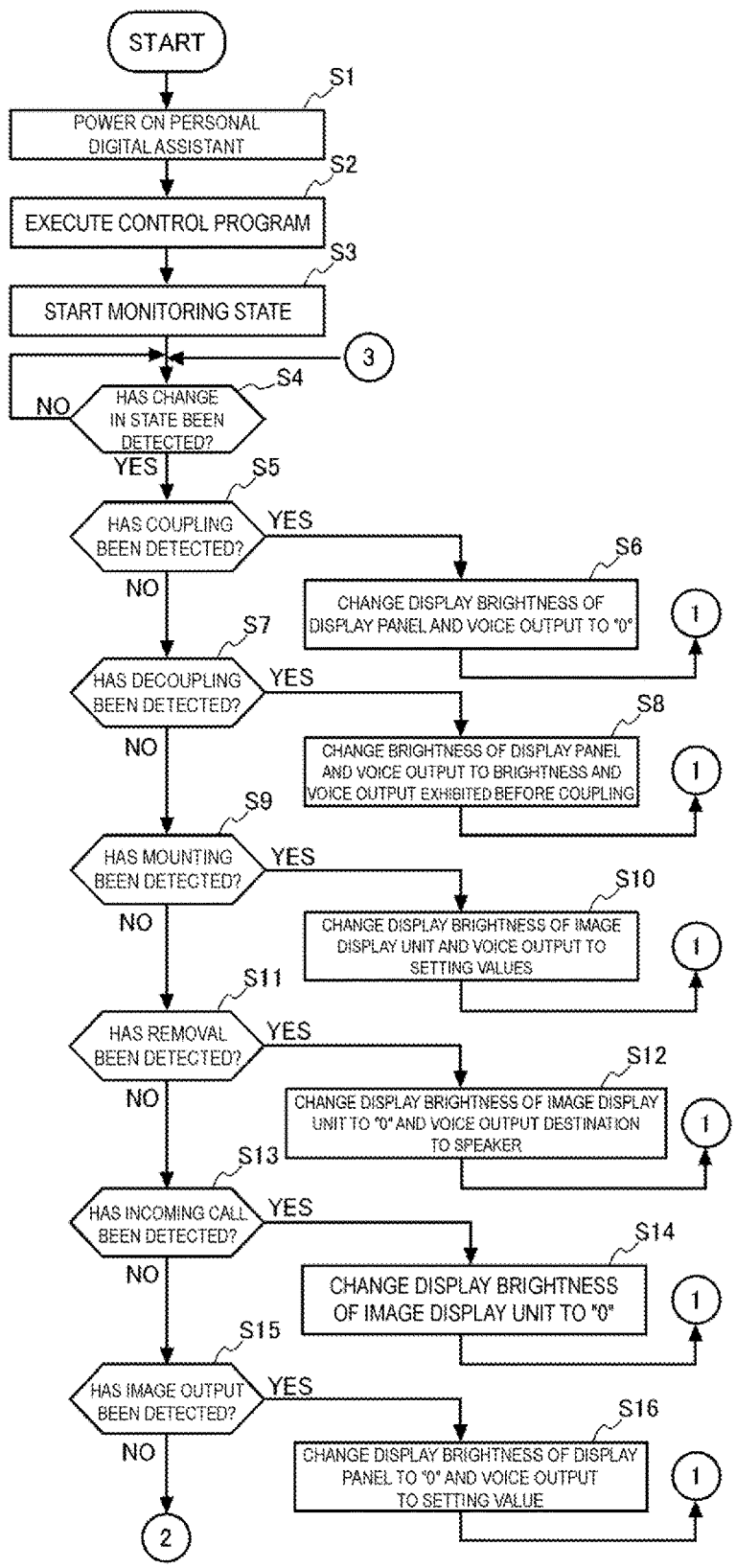
FIG. 4 is a flowchart illustrating operations of the personal digital assistant.
Figure 5:
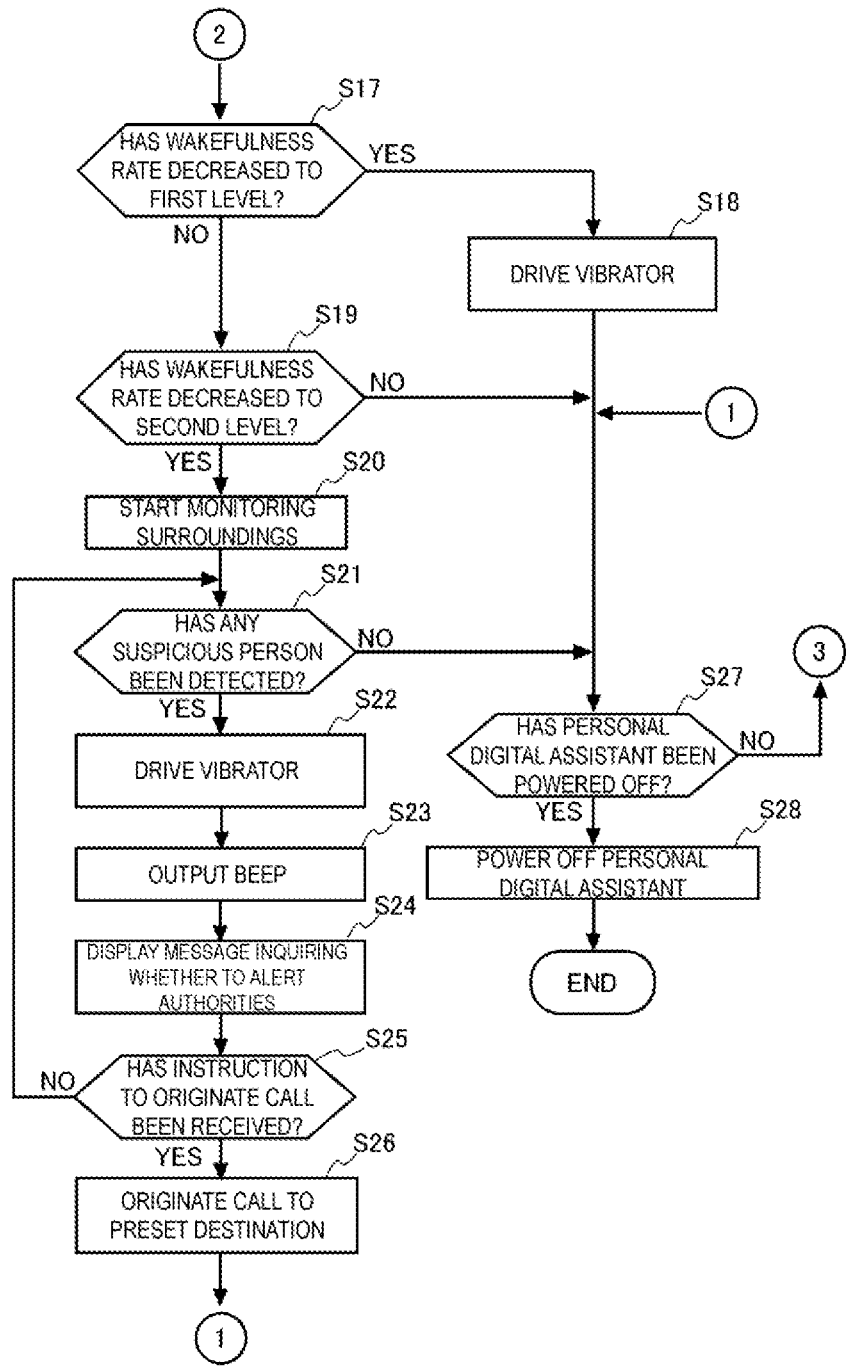
FIG. 5 is a flowchart illustrating operations of the personal digital assistant.

FIG. 4 and FIG. 5 are flowcharts illustrating operations of the device control unit 330 of the personal digital assistant 300.

When the personal digital assistant 300 is powered on (step S1), the device control unit 330 executes the control program (step S2) to start monitoring a change in the state of the personal digital assistant 300 and the HMD 200 (step S3).

When no change in states is detected (step S4/NO), the device control unit 330 waits to start processing until a change in state is detected. When detecting a change in state (step S4/YES), the device control unit 330 determines whether the detected change in state is detection of coupling of the HMD 200 or not (step S5).

When the detected change in state is the detection of coupling (step S5/YES), the device control unit 330 causes the current setting value for the display brightness of the display panel 321 and the current setting value for the voice output of the speaker 315 to be stored in the non-volatile storage unit 309. Thereafter, the device control unit 330 changes the display brightness of the display panel 321 to "0" and changes the voice output of the speaker 315 to "0" (step S6).

When the detected change in state is not the detection of coupling (step S5/NO), the device control unit 330 determines whether the detected change in state is detection of decoupling corresponding to the decoupling of the HMD 200 or not (step S7).

When the detected change in state is the detection of decoupling (step S7/YES), the device control unit 330 acquires the setting value for the display brightness of the display panel 321 and the setting value for the voice output of the speaker 315, stored in the non-volatile storage unit 309. The setting value for the display brightness of the display panel 321 and the setting value for the voice output of the speaker 315, stored in the non-volatile storage unit 309, are the setting value for the display brightness of the display panel 321 and the setting value for the voice output of the speaker 315 used before coupling of the HMD 200 is detected. The device control unit 330 changes the display brightness of the display panel 321 to the display brightness corresponding to the acquired setting value (step S8). The device control unit 330 changes the voice output of the speaker 315 to the voice output corresponding to the acquired setting value (step S8).

When the detected state change is not the detection of decoupling (step S7/NO), the device control unit 330 determines whether the detected change in state is mounting of the image display unit 20 on the head of the user or not (step S9). When the detected change in state is mounting of the image display unit 20 on the head of the user (step S9/YES), the device control unit 330 changes the display brightness of the image display unit 20 to the display brightness corresponding to the setting value stored in the non-volatile storage unit 109 (step S10). The device control unit 330 changes the voice output from the right earphone 32 and the left earphone 34 to the voice output corresponding to the setting value stored in the non-volatile storage unit 309 (step S10).

The detected change in state is not the mounting of the image display unit 20 on the head of the user (step S9/NO), the device control unit 330 determines whether the detected change in state is removal of the image display unit 20 from the head of the user or not (step S11). When the detected change in state is the removal of the image display unit 20 from the head of the user (step S11/YES), the device control unit 330 causes the current setting value for the voice output of the HMD 200 to be stored in the non-volatile storage unit 309. The device control unit 330 causes the setting value for the display brightness of the image display unit 20 to be stored in the non-volatile storage unit 109. Thereafter, the device control unit 330 changes the display brightness of the image display unit 20 to "0" and changes the voice output destination from the HMD 200 to the speaker 315 (step S12).

When the detected change in state is not the removal of the image display unit 20 from the head of the user (step S11/NO), the device control unit 330 determines whether the detected change in state is detection of an incoming call or not (step S13). When the detected change in state is the detection of an incoming call (step S13/YES), the device control unit 330 changes the display brightness of the image display unit 20 to "0" (step S14).

When the detected change in state is not the detection of an incoming call (step S13/NO), the device control unit 330 determines whether the detected change in state is image output to the HMD 200 or not (step S15). When the detected change in state is the image output to the HMD 200 (step S15/YES), the device control unit 330 changes the display brightness of the display panel 321 to "0". The device control unit 330 changes the voice output to the HMD 200 to the output corresponding to the setting value stored in the non-volatile storage unit 309 (step S16).

When the detected change in state is not the image output to the HMD 200 (step S15/NO), the device control unit 330 determines whether the detected change in state is degradation of wakefulness to the first level or not (step S17). When the wakefulness of the user is degraded to the first level (step S17/YES), the device control unit 330 causes the vibrator 313 and the vibrator 65 to be driven (step S18) to awaken the user.

When the detected change in state is not the degradation of wakefulness of to the first level (step S17/NO), the device control unit 330 determines whether the detected change in state is degradation of wakefulness to the second level (step S19). When the detected change in state is the degradation of wakefulness to the second level (step S19/YES), the device control unit 330 starts surrounding monitoring (step S20). When the detected change in state is not the degradation of wakefulness of to the second level (step S19/NO), the device control unit 330 transitions to the determination in step S27.

When starting the surrounding monitoring, the device control unit 330 causes the camera 61 to perform imaging and starts detecting a suspicious person in the imaging data from the camera 61 (step S21). When detecting no suspicious person in the imaging data (step S21/NO), the device control unit 330 transitions to the determination in step S27.

When detecting a suspicious person in the imaging data (step S21/YES), the device control unit 330 causes the vibrator 313 and the vibrator 65 to be driven (step S22), and causes a beep sound to be output from the speaker 315 (step S23). The device control unit 330 displays, on the display panel 321, a message indicating that a suspicious person has been detected and inquiring whether to originate a call to a preset destination (step S24).

When receiving an instruction to originate a call to the outgoing destination (step S25/YES), the device control unit 330 controls the wireless communication unit 301 to originate a call to the preset outgoing destination (step S26). When receiving no instruction for an outgoing call (step S25/NO), the device control unit 330 returns to the determination in step S21 to continue detecting a suspicious person.

The device control unit 330 determines in step S27 whether the personal digital assistant 300 has been powered off or not. When the personal digital assistant 300 has not been powered off (step S27/NO), the device control unit 330 returns to step S4 to detect a change in state. When the personal digital assistant 300 has been powered off (step S27/YES), the device control unit 330 causes data needing to be saved to be stored in the non-volatile storage unit 309, and powers off the personal digital assistant 300 (step S28).

As described above, the display system 1 of the present embodiment includes the HMD 200, which is an example of the display apparatus, and the personal digital assistant 300, which is an example of the device.

The HMD 200 includes the image display unit 20 and the detected value output unit 125. The image display unit 20 is a transmissive type display unit worn by the user on the head and transmitting external light, and displays an image output by the personal digital assistant 300. The image display unit 20 is equipped with a first sensor. The first sensor includes, for example, the six-axis sensor 243, the magnetic sensor 244 and the proximity sensor 245. The detected value output unit 125 outputs, to the personal digital assistant 300, detected values from the first sensor.

The personal digital assistant 300 includes the display unit 320 and the device control unit 330.

The display unit 320 includes the display panel 321.

The device control unit 330 functions as the acquisition unit 334 configured to acquire, from the HMD 200, the detected values from the first sensor. The device control unit 330 also functions as the display control unit 336 configured to control display of the display unit 320 based on the detected values acquired by the acquisition unit 334.

In the display system 1 including the above-described components, the display of the display unit 320 of the personal digital assistant 300 is controlled based on the detected values from the first sensor mounted in the HMD 200. Accordingly, time and effort needed for operation can be reduced, improving usability.

The personal digital assistant 300 includes the image output unit 335 configured to output, to the HMD 200, the image displayed on the image display unit 20, and the coupling detection unit 333 configured to detect coupling to and decoupling from the HMD 200.

When coupling to the HMD 200 is detected by the coupling detection unit 333, the device control unit 330 causes the image output unit 335 to output, to the HMD 200, the image displayed on the display unit 320, and displays the image on the image display unit 20.

Accordingly, by coupling the HMD 200 to the personal digital assistant 300, the image displayed on the display unit 320 of the personal digital assistant 300 can be displayed by the HMD 200 image display unit 20. Thus, the time and effort needed for operation by the user can be reduced, improving the usability.

When the coupling to the HMD 200 is detected by the coupling detection unit 333, the device control unit 330 causes the display control unit 336 to make the display brightness of the display unit 320 lower than that exhibited before the coupling to the HMD 200 is detected.

When decoupling from the HMD 200 is detected by the coupling detection unit 333, the device control unit 330 causes the display control unit 336 to make the display brightness of the display unit 320 higher than that exhibited before the decoupling from the HMD 200 is detected.

Accordingly, the time and effort needed for operation by the user can be reduced, improving usability.

The personal digital assistant 300 includes the voice signal processing unit 337 configured to process voice signals, and the speaker 315 configured to output voice signals.

the HMD 200 includes the right earphone 32 and the left earphone 34 configured to output voice signals.

When coupling to the HMD 200 is detected by the coupling detection unit 333, the device control unit 330 causes the voice signal processing unit 337 to change the output destination of a voice signal from the speaker 315 to the right earphone 32 and the left earphone 34.

Accordingly, by coupling the HMD 200 to the personal digital assistant 300, the output destination of the voice signal can be changed from the speaker 315 to the right earphone 32 and the left earphone 34. Thus, the time and effort needed for operation by the user can be reduced, improving the usability.

When coupling to the HMD 200 is detected by the coupling detection unit 333 detects or when decoupling from that the HMD 200 is detected by the coupling detection unit 333, the device control unit 330 causes the voice signal processing unit 337 to change the output level of the voice signal.

Accordingly, even when the output destination of the voice signal is changed, the voice can be output at an output level suitable for the changed output destination.

When mounting of the image display unit 20 on the head is detected based on the detected value from the proximity sensor 245, the device control unit 330 causes the display control unit 336 to make the display brightness of the display unit 320 lower than that exhibited before mounting of the image display unit 20 on the head is detected.

When mounting the image display unit 20 on the head, the user is assumed to view the image displayed by the image display unit 20. Accordingly, reducing the display brightness of the display unit 320 of the personal digital assistant 300 enables a reduction in time and effort needed for operation by the user, improving the usability.

The device control unit 330 functions as the external apparatus control unit 339 configured to operate the HMD 200.

When the mounting of the image display unit 20 to the head is detected, the state change detection unit 338 causes the external apparatus control unit 339 to make the display brightness of the image display unit 20 higher than that exhibited before the mounting of the image display unit 20 on the head is detected.

When mounting the image display unit 20 on the head, the user is assumed to view the image displayed by the image display unit 20. Thus, changing the display brightness of the image display unit 20 to a higher value enables a reduction in time and effort needed for operation by the user, improving the usability.

When the removal of the image display unit 20 from the head is detected, the state change detection unit 338 causes the external apparatus control unit 339 to make the display brightness of the image display unit 20 lower than that exhibited before the removal of the image display unit 20 from the head is detected.

When the user removes the image display unit 20 from the head, the user is assumed to view the image displayed on the display unit 320 of the personal digital assistant 300. Thus, changing the display brightness of the image display unit 20 to a lower value enables a reduction in time and effort needed for operation by the user, improving the usability.

The personal digital assistant 300 includes the wireless communication unit 301 configured to perform voice communication.

The state change detection unit 338 reduces the display brightness of the image display unit 20 when the radio communication unit 301 detects an incoming call.

Accordingly, when the user makes a phone call, the display brightness of the image display unit 20 decreases to provide appropriate visibility for the user, allowing the usability to be improved.

The personal digital assistant 300 includes the vibrator 313 configured to provide notification by vibration. The state change detection unit 338 detects the wakefulness of the user wearing the image display unit 20 based on the detected values from the first sensor. The state change detection unit 338 operates the vibrator 313 when detecting degradation of the wakefulness of the user to the first level.

Accordingly, the vibrator 313 is driven to allow degradation of the wakefulness of the user to be suppressed.

The HMD 200 includes the vibrator 65 configured to provide notification by vibration.

The device control unit 330 functions as the external apparatus control unit 339 configured to operate the HMD 200.

When detecting a change of the wakefulness of the user to the first level, the state change detection unit 338 operates the vibrator 313 and instructs the external apparatus control unit 339 to operate the vibrator 65.

Accordingly, driving the vibrator 313 or the vibrator 65 allows degradation of the wakefulness of the user to be suppressed.

The HMD 200 includes the camera 61, and the detected value output unit 125 outputs, to the personal digital assistant 300, a captured image from the camera 61.

The personal digital assistant 300 includes the camera 303. When detecting a change of the wakefulness of the used to the second level, the state change detection unit 338 determines the surrounding status of the user based on the captured images from at least one of the camera 61 and the camera 303, and operates the vibrator 313 based on the determination result. The state change detection unit 338 causes the external apparatus control unit 339 to operate the vibrator 65.

Accordingly, when the wakefulness of the used is degraded to the second level, the surroundings of the user can be monitored based on the captured images from the camera 61 and the camera 303. For example, when an abnormality is detected, the vibrator 313 or the vibrator 65 is driven to allow the user to be awaken.

The state change detection unit 338 operates the vibrator 313 when detecting entry of a person into the range preset by the user based on the captured image. The state change detection unit 338 causes the external apparatus control unit 339 to operate the vibrator 65.

Thus, a person approaching the sleeping user can be detected and the vibrator 313 or vibrator 65 can be driven to awaken the user.

The personal digital assistant 300 includes the nine-axis sensor 307.

The state change detection unit 338 detects the state of wakefulness of the user based on a detected value acquired by the acquisition unit 334 and a detected value from the nine-axis sensor 307.

Accordingly, the accuracy at which the state of wakefulness of the user is detected can be enhanced.

Note that the present disclosure is not limited to the exemplary embodiment configured as described above and that the present disclosure can be implemented in various aspects, as long as the aspects fall within the scope of the present disclosure.

For example, when an incoming call is detected by the wireless communication unit 301, the state change detection unit 338 may stop the display of the image on the image display unit 20 and return the setting of the speaker 315 to the standard setting, that is, the setting used before the HMD 200 is coupled to the personal digital assistant 300.

The functional units illustrated in FIG. 1 and FIG. 2 are intended to represent a functional configuration, and specific implementations of the functional units are not particularly limited. In other words, hardware individually corresponding to each of the functional units need not necessarily be implemented, and a configuration is of course possible in which a single processor executes a program to implement the functions of a plurality of the functional units. Some of the functions implemented in software in the above-described embodiment may be hardware, or some of the functions implemented in hardware may be realized by software. Besides, specific details of each of the other units of the projector 1 can be optionally modified without departing from the spirit of the present disclosure.

In the description of FIG. 2, the HMD 200 includes the six-axis sensor 243, the magnetic sensor 244, the proximity sensor 245, and the camera 61. However, in addition to these components, a distance sensor, a temperature sensor, an illuminance sensor, and the like may be mounted. The distance sensor detects, for example, the distance to an object detected by the camera 61. The temperature sensor detects the temperature around the HMD 200. The illuminance sensor detects the illuminance around the HMD 200. Furthermore, a biometric sensor may be provided in the HMD 200. Examples of the biometric sensor include, a brainwave sensor, a pulse wave sensor, a heart rate sensor, a perspiration meter, a thermometer, a respiratory sensor, a blood-pressure meter, a blood flow sensor, a myoelectric sensor, an eye potential sensor, a pupil sensor, a line-of-sight sensor, and the like. The personal digital assistant 300 acquires biometric information from the biometric sensor of the HMD 200, and determines the state of wakefulness of the user based on the acquired biometric information.

The processing units in the flowcharts illustrated in FIG. 4 and FIG. 5 are obtained by dividing the processing in accordance with main processing contents in order to facilitate the understanding of the processing. Thus, the present disclosure is not limited by the manner of dividing the processing into the processing units or the names of the processing units. The processing units may be divided into more processing units in accordance with the processing contents, or the processing may be divided such that each processing unit includes more of the processing. The order of the processing may be changed as appropriate to the extent that the spirit of the present disclosure is not affected.

When the method of controlling the personal digital assistant 300 as a device is implemented using a computer provided in the personal digital assistant 300, the program executed by the computer may be configured in the form of a recording medium or a transmission medium that transmits a program. The recording medium may be a magnetic recording medium, an optical recording medium, or a semiconductor memory device. Specifically, the recording medium may be a portable or fixed recording medium, such as a flexible disk, a hard disk drive (HDD), a compact disk read only memory (CD-ROM), a digital versatile disk (DVD), a Blu-ray (trade name) disc, a magneto-optical disk, a flash memory, or a card-type recording medium. The above-described recording medium may be a non-volatile storage device such as a random access memory (RAM), a read only memory (ROM), and an HDD all representing internal storage devices included in the personal digital assistant 300.

What is claimed is:

1. A display system comprising a device and a display apparatus coupled to the device,
the display apparatus including:
a transmissive type display configured to be worn by a user on a head and transmit external light, the transmissive type display displaying an image output by the device;
a first sensor provided in the transmissive type display; and
a detected value output configured to output, to the device, a detected value from the first sensor, and
the device including:
a device display configured to display an image;
a processor configured to function as:
an acquisition unit that acquires the detected value from the first sensor, output by the display apparatus;
a device control unit that controls display of the device display unit, based on the detected value acquired by the acquisition unit; and
a coupling detection unit that detects coupling to and decoupling from the display apparatus; and
an image output configured to output an image to the display apparatus,
wherein
the image output outputs to the display apparatus the image displayed on the device display and displays the image on the transmissive type display, when coupling to the display apparatus is detected by the coupling detection unit, and
the device control unit makes, when decoupling from the display apparatus is detected by the coupling detection unit, a display brightness of the device display higher than that exhibited before the decoupling from the display apparatus is detected.

2. The display system according to claim 1, wherein the device control unit makes, when coupling to the display apparatus is detected by the coupling detection unit, a display brightness of the device display lower than that exhibited before the coupling to the display apparatus is detected.

3. The display system according to claim 1, wherein
the processor is further configured to function as a voice signal processing unit that processes a voice signal,
the device includes a first voice signal output configured to output the voice signal,
the display apparatus includes a second voice signal output configured to output the voice signal, and
the device control unit causes the voice signal processing unit to change an output destination of the voice signal from the first voice signal output to the second voice signal output when coupling to the display apparatus is detected by the coupling detection unit.

4. The display system according to claim 3, wherein the device control unit causes the voice signal processing unit to change an output level of the voice signal when coupling to the display apparatus is detected by the coupling detection unit or when decoupling from the display apparatus is detected by the coupling detection unit.

5. The display system according to claim 1, wherein
the first sensor is a proximity sensor, and
the device control unit detects mounting of the transmissive type display on the head, based on the detected value, and
makes, when the mounting of the transmissive type display on the head is detected, a display brightness of the device display lower than that exhibited before the mounting of the transmissive type display on the head is detected.

6. The display system according to claim 5, wherein
the processor is further configured to function as an external apparatus control unit that operates the display apparatus, and
the device control unit causes, when mounting of the transmissive type display on the head is detected, the external apparatus control unit to make the display brightness of the transmissive type display higher than that exhibited before the mounting of the transmissive type display on the head is detected.

7. The display system according to claim 6, wherein
the device control unit causes, when removal of the transmissive type display from the head is detected, the external apparatus control unit to make the display brightness of the transmissive type display lower than that exhibited before the removal of the transmissive type display from the head is detected.

8. The display system according to claim 6, wherein
the device includes a wireless communication unit configured to perform voice communication, and
the device control unit causes the external apparatus control unit to reduce the display brightness of the transmissive type display when the wireless communication unit detects an incoming call.

9. The display system according to claim 1, wherein
the device includes a first vibrator configured to provide notification by vibration, and
the processor is further configured to function as a state change detection unit that detects, based on the detected value, a state of wakefulness of the user wearing the transmissive type display, and operates the first vibrator when detecting that the state of wakefulness of the user is changed to a predetermined state.

10. The display system according to claim 9, wherein the display apparatus includes a second vibrator configured to provide notification by vibration,
the processor is further configured to function as an external apparatus control unit that operates the display apparatus, and
the state change detection unit operates the first vibrator or causes the external apparatus control unit to operate the second vibrator, when detecting that the state of wakefulness of the user is changed to the predetermined state.

11. The display system according to claim 10, wherein the display apparatus includes a camera,
the detected value output outputs, to the device, a captured image from the camera,
the device includes a second camera, and
the state change detection unit determines, when detecting that the state of wakefulness of the user is changed to the predetermined state, a surrounding status of the user, based on a captured image from at least one of the first camera and the second camera and operate the first vibrator or cause the external apparatus control unit to operate the second vibrator, based on determination result.

12. The display system according to claim 11, wherein the state change detection unit operates the first vibrator or causes the external apparatus control unit to operate the second vibrator when detecting, based on the captured image, entry of a person into a range preset by the user.

13. The display system according to claim 9, wherein the device includes a second sensor, and
the state change detection unit detects the state of wakefulness of the user, based on the detected value acquired by the acquisition unit and the detected value from the second sensor.

14. A device coupled to a display apparatus including a transmissive type display worn by a user on a head and transmitting external light, the device comprising:
a device display configured to display an image;
a processor configured to function as
an acquisition unit that acquires a detected value from a first sensor provided in the transmissive type display;
a device control unit that controls display of the device display, based on the detected value acquired by the acquisition unit; and
a coupling detection unit that detects coupling to and decoupling from the display apparatus; and
an image output configured to output an image to the display apparatus,
wherein
the image output outputs to the display apparatus the image displayed on the device display and displays the image on the transmissive type display, when coupling to the display apparatus is detected by the coupling detection unit, and
the device control unit makes, when decoupling from the display apparatus is detected by the coupling detection unit, a display brightness of the device display higher than that exhibited before the decoupling from the display apparatus is detected.

15. A non-transitory computer-readable storage medium storing a program, the program causing a computer mounted in a device coupled to a display apparatus including a transmissive type display worn by a user on a head and transmitting external light, with the device displaying an image on the transmissive type display, to function as:
an acquisition unit that acquires a detected value from a first sensor provided in the transmissive type display;
a device control unit that controls, based on the acquired detected value, display of a device display configured to display an image;
a coupling detection unit that detects coupling to and decoupling from the display apparatus; and
an image output that outputs an image to the display apparatus,
wherein
the image output outputs to the display apparatus the image displayed on the device display and displays the image on the transmissive type display, when coupling to the display apparatus is detected by the coupling detection unit;
wherein the device control unit makes, when decoupling from the display apparatus is detected by the coupling detection unit, a display brightness of the device display higher than that exhibited before the decoupling from the display apparatus is detected.

16. A display system comprising a device and a display apparatus coupled to the device,
the display apparatus including:
a transmissive type display configured to be worn by a user on a head and transmit external light, the transmissive type display displaying an image output by the device;
a first sensor provided in the transmissive type display; and
a detected value output configured to output, to the device, a detected value from the first sensor, and
the device including:
a device display configured to display an image; and
a processor configured to function as:
an acquisition unit that acquires the detected value from the first sensor, output by the display apparatus; and
a device control unit that controls display of the device display, based on the detected value acquired by the acquisition unit,
wherein
the first sensor is a proximity sensor, and
the device control unit detects mounting of the transmissive type display on the head, based on the detected value, and makes, when the mounting of the transmissive type display on the head is detected, a display brightness of the device display lower than that exhibited before the mounting of the transmissive type display on the head is detected.

17. A device coupled to a display apparatus including a transmissive type display worn by a user on a head and transmitting external light, the device comprising:
a device display configured to display an image; and
a processor configured to function as
an acquisition unit that acquires a detected value from a first sensor provided in the transmissive type display; and
a device control unit that controls display of the device display, based on the detected value acquired by the acquisition unit,
wherein
the first sensor is a proximity sensor, and
the device control unit detects mounting of the transmissive type display on the head, based on the detected value, and makes, when the mounting of the transmissive type display on the head is detected, a display brightness of the device display lower than that exhibited before the mounting of the transmissive type display on the head is detected.

18. A non-transitory computer-readable storage medium storing a program, the program causing a computer mounted in a device coupled to a display apparatus including a transmissive type display worn by a user on a head and transmitting external light, with the device displaying an image on the transmissive type display, to function as:
- an acquisition unit that acquires a detected value from a proximity sensor provided in the transmissive type display; and
- a device control unit that
  - controls, based on the acquired detected value, display of a device display configured to display an image,
  - detects mounting of the transmissive type display on the head, based on the detected value, and
  - makes, when the mounting of the transmissive type display on the head is detected, a display brightness of the device display lower than that exhibited before the mounting of the transmissive type display on the head is detected.

\* \* \* \* \*